United States Patent
Kamiya et al.

(10) Patent No.: US 8,336,299 B2
(45) Date of Patent: Dec. 25, 2012

(54) EXHAUST GAS CLEANING SYSTEM FOR CONSTRUCTION MACHINE

(75) Inventors: Shohei Kamiya, Kasumigaura (JP); Kazunori Nakamura, Tsuchiura (JP)

(73) Assignee: Hitachi Construction Machinery Co., Ltd., Tokyo (JP)

( * ) Notice: Subject to any disclaimer, the term of this patent is extended or adjusted under 35 U.S.C. 154(b) by 454 days.

(21) Appl. No.: 12/527,913

(22) PCT Filed: Aug. 6, 2008

(86) PCT No.: PCT/JP2008/064160
§ 371 (c)(1),
(2), (4) Date: Aug. 20, 2009

(87) PCT Pub. No.: WO2009/041165
PCT Pub. Date: Apr. 2, 2009

(65) Prior Publication Data
US 2010/0095656 A1   Apr. 22, 2010

(30) Foreign Application Priority Data
Sep. 25, 2007  (JP) .................... 2007-247952

(51) Int. Cl.
*F01N 3/025*   (2006.01)
(52) U.S. Cl. .......................... 60/295; 60/297
(58) Field of Classification Search .......... 60/286, 60/295, 297, 300, 303
See application file for complete search history.

(56) References Cited

U.S. PATENT DOCUMENTS
2004/0261401 A1*  12/2004  Ohkl et al. ............ 60/285

FOREIGN PATENT DOCUMENTS

| JP | 60-38561 B2 | 9/1985 |
|---|---|---|
| JP | 2001-280118 A | 10/2001 |
| JP | 2004-150417 A | 5/2004 |
| JP | 2005-139944 A | 6/2005 |
| JP | 2005-282545 A | 10/2005 |
| JP | 2005-299436 A | 10/2005 |
| JP | 2005-344549 A | 12/2005 |
| JP | 2006-37925 A | 2/2006 |
| JP | 2007-170382 A | 7/2007 |
| JP | 2007-205240 A | 8/2007 |
| JP | 2007-239624 A | 9/2007 |

* cited by examiner

*Primary Examiner* — Thomas Denion
*Assistant Examiner* — Jonathan Matthias
(74) *Attorney, Agent, or Firm* — Mattingly & Malur, PC (57) ABSTRACT

Before a large amount of PM is deposited in a filter, an exhaust gas cleaning system for a construction machine regenerates the filter.
In a non-operational state with the engine 1 of the construction machine left running for a certain time, a controller 4 monitors the non-operational state. After this state continues for a predetermined time Ta, when the pressure sensed by a differential pressure sensor 36 is higher than a second predetermined pressure level P2, the controller 4 controls the rotating speed of the engine 1 to a predetermined speed Na before starting forced regeneration to burn off the PM deposited in a filter 32. When the pressure sensed by the differential pressure sensor 36 decreases below a first predetermined pressure level P1, the controller 4 terminates the regeneration automatically and returns the engine to normal control mode.

8 Claims, 6 Drawing Sheets

FIG.6 ns system for construction machine

TECHNICAL FIELD

The present invention relates generally to exhaust gas cleaning systems for construction machines. More particularly, the invention concerns an exhaust gas cleaning system for a construction machine, the system being intended to clean exhaust gases by filter-trapping any particulate matter included in the exhaust gases, and to regenerate the filter by burning off the filter-trapped particulate matter as appropriate.

BACKGROUND ART

Hydraulic excavators and other construction machines have a diesel engine as a driving source for the machine. Regulations on the amount of particulate matter (PM) emitted from the diesel engine are being strengthened each year along with those of NOx, CO, HC, and the like. Exhaust gas cleaning systems for trapping PM with a filter called the diesel particulate filter (DPF), and reducing the amount of PM emitted to the outside, are known to be effective under the increasingly stringent regulation situation (refer to Patent Documents 1 to 3). In these exhaust gas cleaning systems, since increases in the amount of filter-trapped PM clog the filter, thus increase the engine exhaust gas pressure, and result in undesirable events such as decreases in fuel efficiency, the filter-trapped PM is burned in appropriate timing to remove the PM clogging the filter, and hence to regenerate the filter.

The filter is usually regenerated using an oxidizing catalyst. The oxidizing catalyst may be disposed at the upstream side of the filter or supported by the filter directly or provided in both forms. In all of the three cases, to activate the oxidizing catalyst, it is necessary that the engine exhaust gas temperature be higher than the activation temperature of the oxidizing catalyst. Therefore, the technology called "forced regeneration" that forcibly increases the exhaust gas temperature above the activation temperature of the oxidizing catalyst is applied. Forced regeneration uses, for example, one of two methods: increasing the exhaust gas temperature by, as disclosed in Patent Document 1 or 2, conducting subsidiary injection (post-injection) to inject the fuel during the expansion stroke of the engine after in-cylinder main injection, or as disclosed in Patent Document 3, increasing the exhaust gas temperature by injecting the fuel into the exhaust gases flowing through a regenerating fuel injector provided in the exhaust pipe.

Also, forced regeneration of the filter has two forms: manual regeneration, which is started upon operator input of an operating instruction; and automatic regeneration, which is started automatically. Traditionally, as described in Patent Documents 1 and 2, regeneration in these forced regeneration forms is started in the timing that the estimated amount of PM deposition in the filter (i.e., the estimated accumulation level) reaches the previously set maximum permissible accumulation level of PM. In this case, as in the technique of Patent Document 1, the amount of PM deposition computed is generally based upon the sensed value of a differential pressure existing across the filter. Another computing method is by, as in the technique of Patent Document 2, reading in the output values of a speed sensor, a load sensor, and a temperature sensor, then after calculating the amount of PM emission, We, and the amount of PM combustion, Wc, deriving the amount of PM deposition, Wa, from Wa=We−Wc, and adding Wa1, the previous value of Wa, to newly obtain an integrated deposition level Wa1.

Patent Document 1: JP-A-2005-282545
Patent Document 2: JP-A-2001-280118
Patent Document 3: JP-A-2007-170382

DISCLOSURE OF THE INVENTION

Problems to be Solved by the Invention

As described above, in the conventional exhaust gas cleaning systems, the amount of PM deposited in the filter is estimated and forced regeneration is started upon the arrival of this estimated PM deposition level at a predetermined value. However, the regeneration occurs after a large amount of PM has been trapped by the filter, so this is likely to cause decreases in output due to exhaust gas pressure rises existing immediately before the regeneration is started. In addition, in the method of computing the PM deposition level by sensing the differential pressure across the filter, the relationship between the differential pressure across the filter and the PM deposition level is not linear, and the PM deposition level is difficult to derive accurately by computing. The same problem also occurs in the method of deriving the PM deposition level by calculating the PM emission level We and the PM combustion level Wc, since the relationship between the sensor data, the PM emission level We, and the PM combustion level Wc, is disturbed by various factors. Unusual increases in the internal temperature of the filter due to the combustion of the large amount of trapped PM, thermal damage to the filter that may originate from the unusual temperature rises, and other problems are liable to result if the PM deposition level cannot be derived accurately by computing.

An object of the present invention is to provide an exhaust gas cleaning system for a construction machine, constructed so that before a large amount of PM becomes deposited in a filter, the system regenerates the filter to avoid a decrease in output due to an exhaust gas pressure rise existing immediately before the regeneration is started, and to reduce the likelihood of an unusual increase in an internal temperature of the filter due to combustion of the PM, associated with execution of the regeneration, and consequential thermal damage to the filter.

Means for Solving the Problems (1) In order to achieve the above object, an aspect of the present invention is an exhaust gas cleaning system for a construction machine equipped with a diesel engine, a plurality of driven bodies which are actuated by motive power of the engine, and operating means for issuing commands to each of the driven bodies, the system including: a filter disposed in an exhaust system of the engine in order to trap any particulate matter (PM) included in exhaust gases; a regenerating device that regenerates the filter by burning off the PM deposited therein; operational sensing means for sensing an operational state of the operating means; and a regeneration control device that activates the regenerating device when a non-operational state of the operating means is sensed by the operational sensing means and the non-operational state continues for a predetermined time.

As described above, the system includes the regenerating device, the operational sensing means, and the regeneration control device, and is constructed to activate the regenerating device when the non-operational state of the operating means is sensed by the operational sensing means and the non-operational state continues for the predetermined time. This results in that when the operating means is returned to a neutral position by an operator and the non-operational state continues for the predetermined time, the regenerating device operates automatically and enters a forced regeneration mode to burn off the PM deposited in the filter. Thus, forced regeneration can be repeated more often than in a case where forced regeneration is started when the amount of PM deposited in the filter exceeds the amount of deposition existing immediately before the regeneration is started.

This allows the filter to be regenerated before a large amount of PM becomes deposited therein. Thus, a decrease in output due to an exhaust gas pressure rise existing immediately before the regeneration is started can be avoided and the likelihood of an unusual increase in an internal temperature of the filter due to the combustion of the PM, associated with execution of the regeneration, and consequential thermal damage to the filter can be reduced.

(2) In above item (1), preferably the regeneration control device deactivates the regenerating device when an operating state of the operating means is sensed by the operational sensing means during operation of the regenerating device.

To restart the work during forced regeneration, the operator can immediately terminate forced regeneration just by operating the operating means. This allows the work to be restarted at once.

(3) In above item (1), preferably the system further includes target speed command means that issues a command for specifying a desirable speed of the engine, wherein the regeneration control device deactivates the regenerating device when a change in the desired speed specified by the target speed command means is sensed during the operation of the regenerating device.

Thus, when the operator operates the target speed command means during forced regeneration to restart the work, forced regeneration terminates immediately, whereby the work can be restarted at once.

(4) In above item (1), preferably the system further includes a pressure sensor that senses a loss of pressure in the filter, wherein the regeneration control device deactivates the regenerating device when the pressure loss sensed by the pressure sensor decreases below a first predetermined pressure level.

This is extremely convenient in that since a decrease in the differential pressure across the filter to a level lower than the first predetermined pressure stops the regeneration automatically, the operator can rest without having to be aware of the fact that the regeneration is in progress. Also, a decrease in life of the filter due to overburning can be avoided.

(5) In above item (1), preferably the system further includes a pressure sensor that senses a loss of pressure in the filter, wherein, when the non-operational state of the operating means is sensed by the operational sensing means and continues for the predetermined time, and when a pressure loss higher than a second predetermined pressure level is sensed by the pressure sensor, the regeneration control device activates the regenerating device.

Thus, even when the non-operational state of the operating means is sensed by the operational sensing means and continues for the predetermined time, if the differential pressure across the filter stays below the second predetermined pressure, the system does not enter forced regeneration. Therefore, unnecessary regeneration can be prevented and a decrease in the life of the filter due to overburning can be avoided.

(6) In above item (1), when the non-operational state of the operating means is sensed by the operational sensing means and continues for the predetermined time, and when the regenerating device is activated, the regeneration control device preferably controls the engine speed to a predetermined level.

Thus, when the non-operational state of the operating means continues for the predetermined time and the regenerating device is activated to start the forced regeneration, the engine speed is controlled to a predetermined level suitable for the regeneration. Therefore, since the exhaust gases can be raised rapidly to a temperature fit for the regeneration of the filter (i.e., the burning-off of the deposited PM), optimal regeneration is enabled. In addition, when the engine speed existing before forced regeneration is started is higher than the predetermined speed for the regeneration, the engine speed is lowered to the predetermined level immediately before forced regeneration is started. This suppresses unnecessary fuel consumption, thereby saving the fuel.

(7) In above item (6), preferably the system further includes target speed command means that issues a command for specifying a desirable speed of the engine, wherein, when the non-operational state of the operating means is sensed by the operational sensing means and continues for the predetermined time, and when a target speed higher than the predetermined level is specified by the target speed command means, the regeneration control device activates the regenerating device.

Thus, even when the non-operational state of the operating means is sensed by the operational sensing means and continues for the predetermined time, if the target speed specified by the target speed command means is lower than the predetermined level, the system does not enter forced regeneration. Therefore, a non-intended increase in engine speed during the start of forced regeneration is avoided, whereby the regenerating device can conduct the regeneration without giving a sense of discomfort to the operator.

(8) In above item (1), preferably the regenerating device further includes an oxidizing catalyst disposed at an upstream side of the filter, and fuel supply means for supplying a fuel to the oxidizing catalyst, the regenerating device being constructed such that after activating the oxidizing catalyst by forcibly raising a temperature of the engine exhaust gases to a level higher than the activation temperature of the oxidizing catalyst, the fuel supply means supplies the fuel to the oxidizing catalyst, and the regenerating device raises the exhaust gas temperature by means of the heat generated by a reaction between the fuel and the catalyst. The particulate matter deposited in the filter is thus burnt off.

This allows reliable forced regeneration of the filter.

Effects of the Invention

According to the present invention, since forced regeneration can be repeated more often than in the case that the start of forced regeneration is repeated each time the PM deposition level in the filter exceeds the deposition level existing before the regeneration is started, the filter can be regenerated before a large amount of PM becomes deposited, and thus a decrease in output due to the exhaust gas pressure rise existing immediately before the regeneration is started can be avoided. In addition, the likelihood of an unusual increase in the internal temperature of the filter due to the combustion of the PM, associated with execution of the regeneration, and consequential thermal damage to the filter can be reduced.

1 Diesel engine
1a Electronic governor
2 Engine control dial
3 Speed sensor
4 Controller
5 Key switch
11 Hydraulic pump
12 Pilot pump
13 Hydraulic motor
14, 15 Hydraulic cylinders
17 to 19, Flow control valves
20 Pilot hydraulic source
21 Pilot relief valve
23 Solenoid control valve
24 Pilot hydraulic line
25, 26, 27 Remotely controlled valves
28, 29 Control levers
31 Exhaust pipe
32 Filter
33 Oxidizing catalyst
34 DPF unit
35 Position sensor
36 Differential pressure sensor
37 Exhaust gas temperature sensor
38 Display unit (Monitor)
38a Display screen
39 Regenerating fuel injector
40 Shuttle valve group
41 to 46 Shuttle valves
100 Lower structure (For traveling)
101 Upper structure (For swinging)
102 Front operating device
104a, 104b Traveling motors
105 Swinging motor
106 Engine room
107 Cabin
111 Boom
112 Arm
113 Bucket
114 Boom cylinder
115 Arm cylinder
116 Bucket cylinder

BEST MODE FOR CARRYING OUT THE INVENTION

Hereunder, an embodiment of the present invention will be described using the accompanying drawings.

Figure 1:
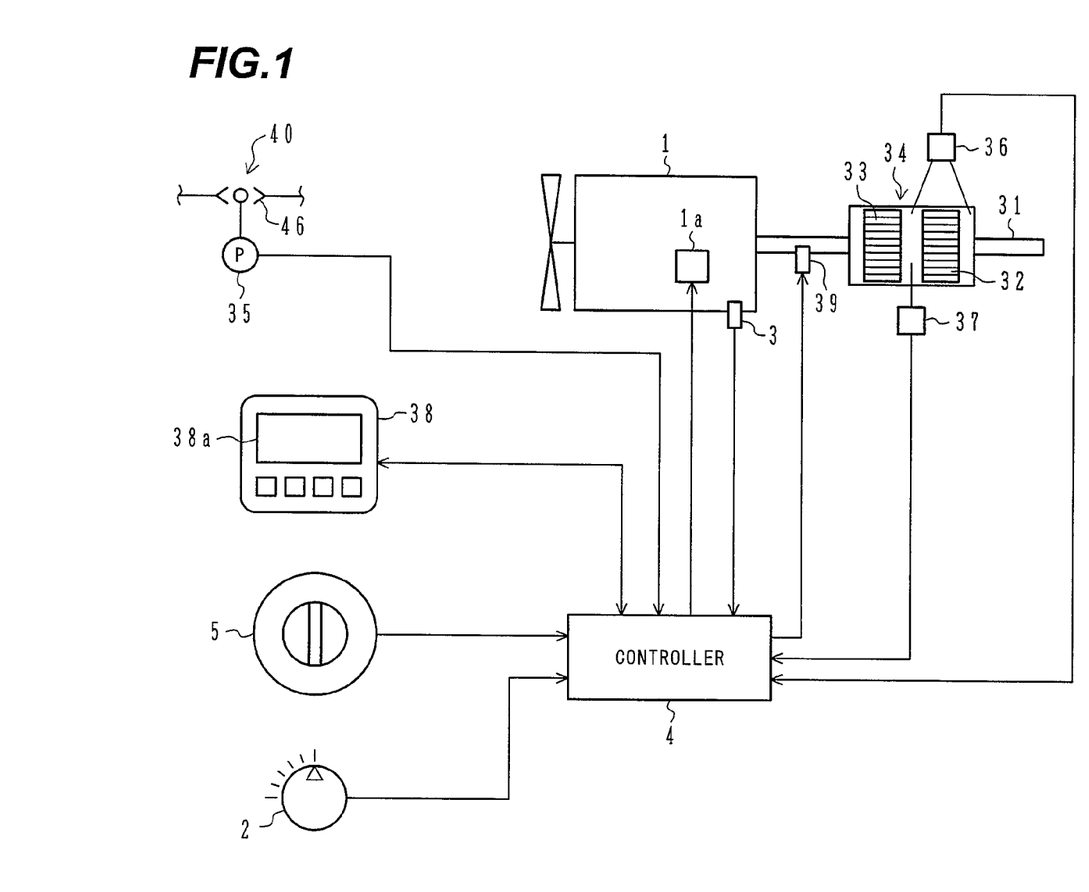
FIG. 1 is a total system block diagram showing an exhaust gas cleaning system for a construction machine according to an embodiment of the present invention.

FIG. 1 is a total system block diagram showing an exhaust gas cleaning system for a construction machine according to an embodiment of the present invention.

Referring to FIG. 1, reference number 1 denotes a diesel engine mounted in the construction machine (e.g., a hydraulic excavator) that has the exhaust gas cleaning system of the present embodiment. The engine 1 includes an electronic governor 1a that is an electronic type of fuel injection control unit. A command specifying a desired rotating speed of the engine 1 is issued from an engine control dial 2, and an actual operating speed of the engine 1 is sensed by a speed sensor 3. The command signal from the engine control dial 2 and a sensor signal from the speed sensor 3 are input to a controller 4, which uses the command signal (target speed) and the sensor signal (actual speed) appropriately to control the electronic governor 1a and thus control the speed of the engine 1 and a torque thereof. Additionally, the exhaust gas cleaning system has a key switch 5 that operates as a starting/stopping command device for the engine 1. Command signals from the key switch 5 are also input to the controller 4, which controls start and stop of the engine 1 on the basis of the command signals.

Figure 2:
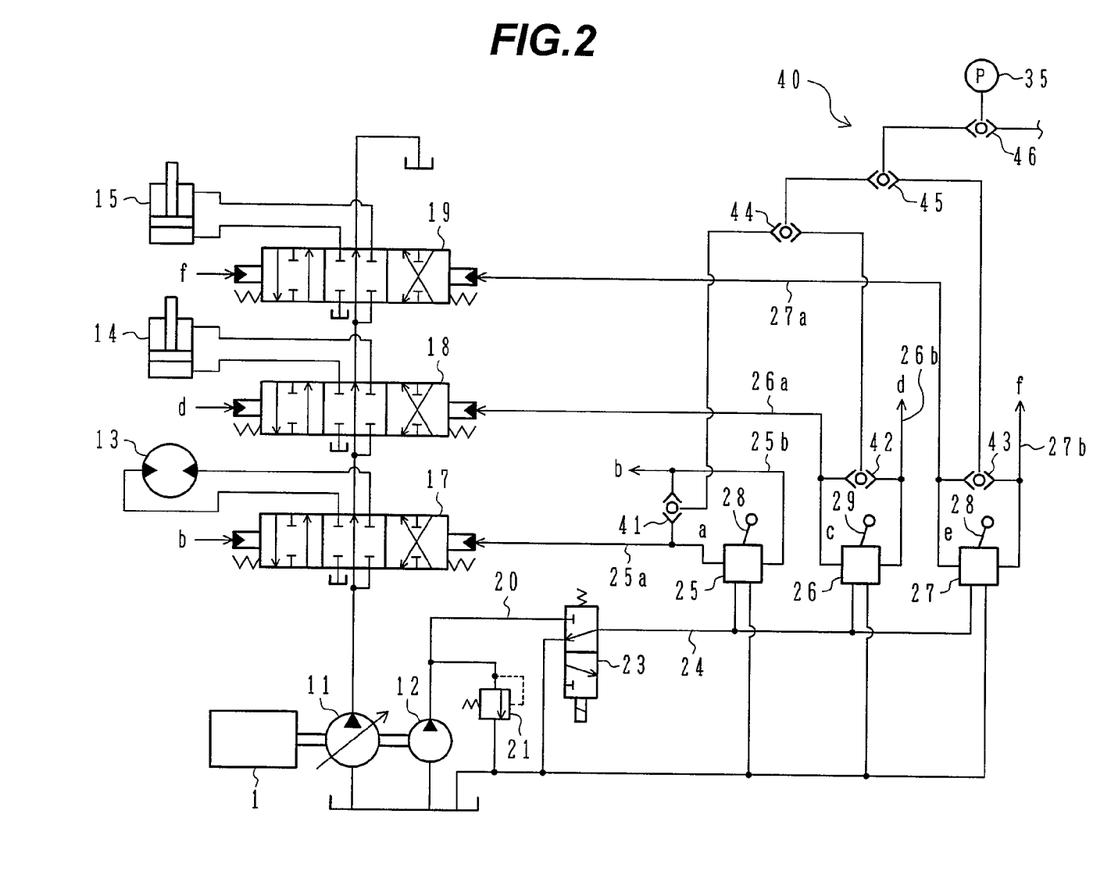
FIG. 2 is a diagram showing a hydraulic driving unit mounted in the construction machine (e.g., a hydraulic excavator)

FIG. 2 is a diagram showing a hydraulic driving unit mounted in the construction machine (e.g., a hydraulic excavator). The hydraulic driving unit has: a variable-capacity type of main hydraulic pump 11 and a fixed-capacity type of pilot pump 12, both types of pumps being driven by the engine 1; a plurality of actuators including a hydraulic motor 13 and hydraulic cylinders 14, 15, each of the motor and the cylinders being driven by a hydraulic operating fluid delivered from the hydraulic pump 11; a plurality of flow control valves inclusive of pilot-actuated flow control valves 17 to 19 to control a flow (flow rate and direction) of the hydraulic operating fluid supplied from the hydraulic pump 11 to the hydraulic motor 13 and each hydraulic cylinder 14, 15; a pilot relief valve 21 for maintaining a constant pressure of the hydraulic operating fluid delivered from the pilot pump 3, and forming a pilot hydraulic source 20; a solenoid control valve 23 connected to a downstream side of the pilot hydraulic source 20 and controlled to an ON or OFF position, depending upon an open or closed condition of a gate lock lever (not shown) that is provided at an accessway to an operator's seat of the hydraulic excavator; and remotely controlled valves 25, 26, 27 connected to a pilot hydraulic line 24 at the downstream side of the solenoid control valve 23 in order to generate control pilot pressures "a" to "f" that use the oil pressure of the pilot hydraulic source 20 as a main pressure to operate the flow control valves 17 to 19.

The remotely controlled valves 25, 26, 27 are controlled using left and right control levers 28 and 29 provided at the left and right sides of the operator's seat. The control levers 28, 29 are each controllable to move in cross directions. Actuation of the control lever 28 in one of the cross directions operates the remotely controlled valve 25, and actuation of the control lever 28 in the other of the cross directions operates the remotely controlled valve 27. Actuation of the control lever 29 in one of the cross directions operates the remotely controlled valve 26, and actuation of the control lever 29 in the other of the cross directions operates a remotely controlled valve not shown. In addition, when the control lever 28 is actuated in one of the cross directions, actuation of this control lever in that direction from a neutral position causes the remotely controlled valve 25 to generate a control pilot pressure "a", and actuation of the control lever in an opposite direction from the neutral position causes the remotely controlled valve 25 to generate a control pilot pressure "b". The control pilot pressures "a" and "b" are guided to an appropriate pressure-receiving section of the flow control valve 17 via pilot lines 25a and 25b, respectively, whereby the flow control valve 17 is switched from a neutral position. Similarly, when the control lever 28 is actuated in the other of the cross directions, actuation of this control lever in that direction from the neutral position causes the remotely controlled valve 27 to generate a control pilot pressure "e", and actuation of the control lever in the opposite direction from the neutral position causes the remotely controlled valve 27 to generate a control pilot pressure "f". The control pilot pressures "e" and "f" are guided to an appropriate pressure-receiving section of the flow control valve 19 via pilot lines 27a and 27b, respectively, whereby the flow control valve 19 is switched from a neutral position. When the control lever 29 is actuated in one of the cross directions, actuation of this control lever in that direction from the neutral position generates a control pilot pressure "c", and actuation of the control lever in the opposite direction from the neutral position generates a control pilot pressure "d". The control pilot pressures "c" and "d" are guided to an appropriate pressure-receiving section of the flow control valve 18 via pilot lines 26a and 26b, respectively, whereby the flow control valve 18 is switched from a neutral position.

Figure 3:
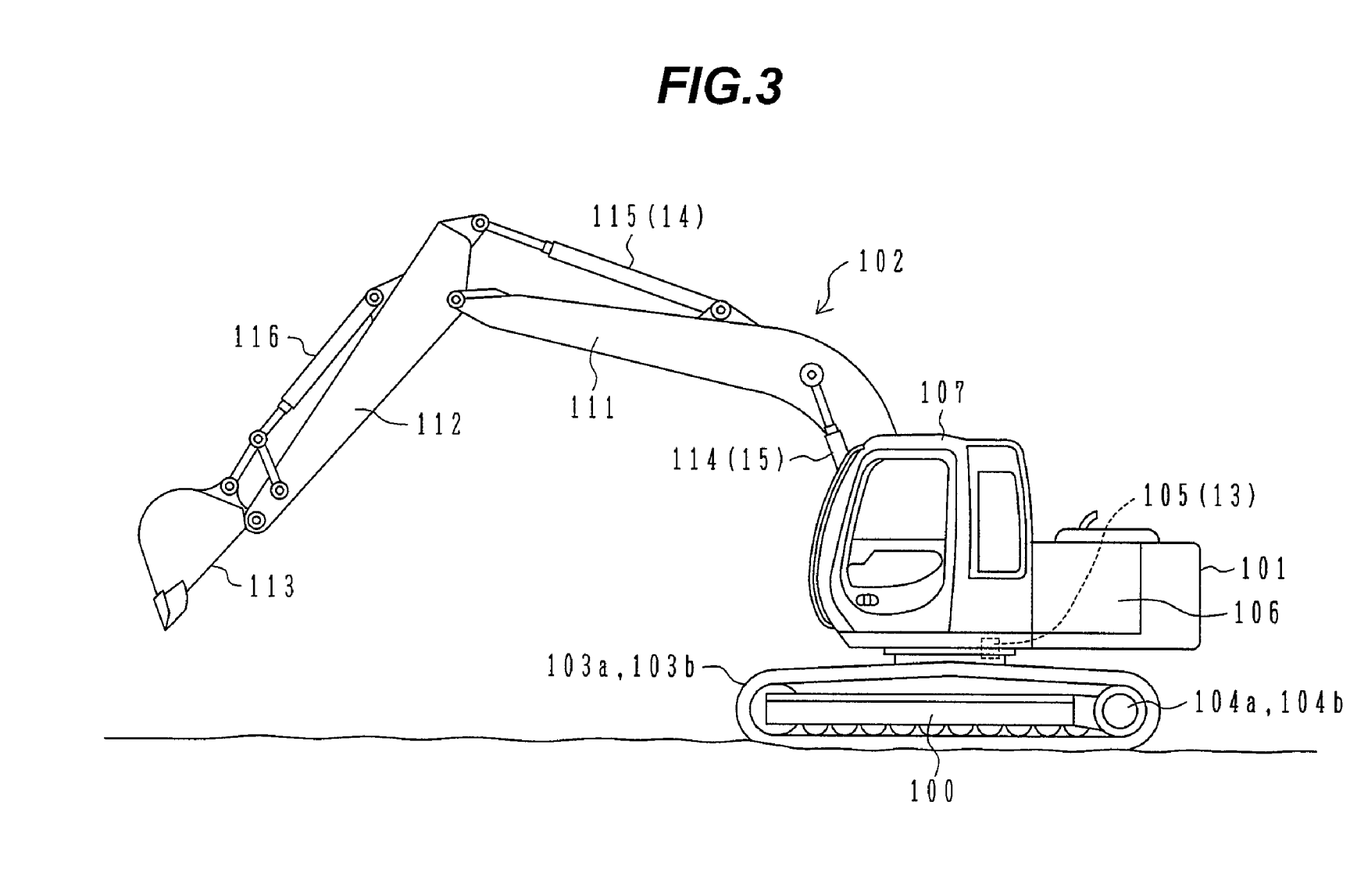
FIG. 3 is an external view of a hydraulic excavator, an example of a construction machine including the hydraulic driving unit shown in FIG. 2.

FIG. 3 is an external view of the hydraulic excavator, an example of a construction machine including the hydraulic driving unit shown in FIG. 2. The hydraulic excavator includes a lower structure 100 (for traveling use), an upper structure 101 (for swinging use), and a front operating device 102. The lower structure 100 has left and right crawler-mounted traveling devices 103a and 103b, and is driven by left and right traveling motors 104a and 104b. The upper structure 101 is mounted on the lower structure 100 so as to be swingable by a swinging motor 105, and the front operating device 102 is installed at an anterior section of the upper structure 101 so as to be vertically inclinable. The upper structure 101 includes an engine room 106 and a cabin 107. The engine 1 is disposed in the engine room 106, the gate lock lever (not shown) is provided at the accessway to the internal operator's seat (not shown) in the cabin 107, and the control levers 28, 29 for the remotely controlled valves 25, 26, 27 are arranged at the left and right sides of the operator's seat.

The front operating device 102 is a multi-articulated structure having a boom 111, an arm 112, and a bucket 113, the boom 111 being pivoted vertically by expanding/contracting actions of a boom cylinder 114, the arm 112 being pivoted vertically and longitudinally by expanding/contracting actions of an arm cylinder 115, and the bucket 113 being pivoted vertically and longitudinally by expanding/contracting actions of a bucket cylinder 116.

Referring to FIG. 2, the hydraulic motor 13 operates in association with, for example, the swinging motor 105, the hydraulic cylinder 14 operates in association with, for example, the arm cylinder 115, and the hydraulic cylinder 15 operates in association with, for example, the boom cylinder 114. The hydraulic driving unit shown in FIG. 2 includes the hydraulic actuators and control valves corresponding to the traveling motors 104a, 104b, the bucket cylinder 116, and the like, and operating devices thereof, but these actuators and control valves are omitted in FIG. 2.

The exhaust gas cleaning system of the present embodiment is equipped in the above-described construction machine (hydraulic excavator). As shown in FIG. 1, the exhaust gas cleaning system of the present embodiment includes: a DPF unit 34 including a filter 32 disposed in an exhaust pipe 31 that forms part of an exhaust system of the engine 1, and adapted to trap any particulate matter included in exhaust gases and an oxidizing catalyst 33 disposed at an upstream side of the filter 32; a shuttle valve group 40 and pressure sensor 35 for sensing whether all operating devices including the control levers 28 and 29 (see FIG. 2) for the remote controlled valves 25 to 27 are being actuated; a differential pressure sensor 36 for sensing a differential pressure existing between the upstream side of the filter 32 and a downstream side thereof (i.e., a pressure loss in the filter 32); an exhaust gas temperature sensor 37 set up at the upstream side of the filter 32 in order to sense a temperature of the exhaust gases; a display unit (monitor) 38; and a regenerating fuel injector 39 provided between the engine 1 and the DPF unit 34, near the exhaust pipe 31.

The oxidizing catalyst 33 and the regenerating fuel injector 39 constitute a regenerating device that regenerates the filter 32 by burning off the particulate matter (PM) deposited therein.

As shown in FIG. 2, the shuttle valve group 40 includes shuttle valves 41 to 46. The shuttle valve 41 is connected between the pilot lines 25a and 25b of the remote controlled valve 25, the shuttle valve 42 is connected between the pilot lines 26a and 26b of the remote controlled valve 26, and the shuttle valve 43 is connected between the pilot lines 27a and 27b of the remote controlled valve 27. The shuttle valve 44 is connected between output ports of the shuttle valves 41 and 42, the shuttle valve 45 is connected between output ports of the shuttle valves 43 and 44, and the shuttle valve 46 is connected between an output port of the shuttle valve 45 and an output port of a shuttle valve present at a final stage associated with a remotely controlled valve of other operating devices not shown. Thus, the shuttle valve group including the shuttle valves 41 to 46 extracts only a maximum pressure of all control pilot pressures that include the control pilot pressures "a", "f" of the remote controlled valves 25 to 27 and a control pilot pressure of the remote controlled valve of the other operating devices (not shown). The shuttle valve 46 at the final stage of the shuttle valve group 40 outputs the maximum pressure. The pressure sensor 35 is connected to the output port of the shuttle valve 46 located at the final stage, and upon sensing the maximum pressure that is the pressure output from the shuttle valve 46, the sensor 35 senses whether all operating devices including the control levers 28, 29 of the remote controlled valves 25 to 27 are being actuated.

Sensor signals from the pressure sensor 35, differential pressure sensor 36, and exhaust gas temperature sensor 37 are input to the controller 4, which then conducts a filter-regenerating arithmetic process based upon those input signals and input signals received from the foregoing speed sensor 3 and key switch 5, and controls the electronic governor 1a and the regenerating fuel injector 39 according to particular arithmetic results. The controller 4 transmits the information indicated by the various signals of the speed sensor 3, key switch 5, pressure sensor 35, differential pressure sensor 36, and exhaust gas temperature sensor 37, as display signals, to the display unit 38. The controller 4 also transmits filter-regenerating arithmetic process result information of the controller 4 as a further display signal to the display unit 38. Upon receiving these kinds of information, the display unit 38 displays the information on the display screen 38a.

Figure 4:
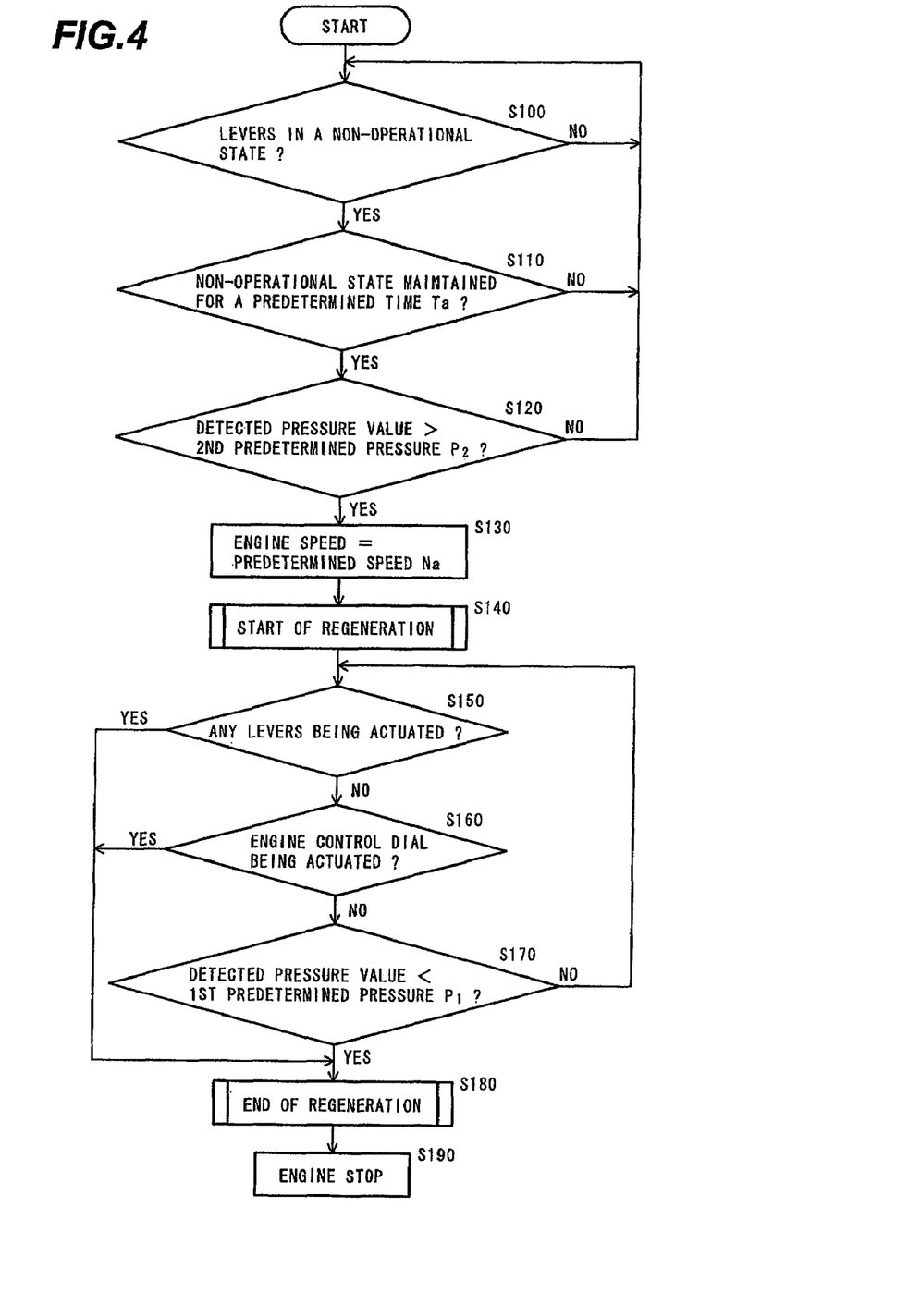
FIG. 4 is a flowchart that shows arithmetic details of a filter-regenerating arithmetic process by the controller shown in FIG. 1.

FIG. 4 is a flowchart that shows arithmetic details of the filter-regenerating arithmetic process of the controller 4.

First, in step S100, the controller 4 checks the sensor signal of the pressure sensor 35 and judges whether all operating devices including the control levers 28, 29 for the remote controlled valves 25 to 27 are in the non-operational state (i.e., whether none of the operating devices is being actuated). When a pressure slightly higher than that output from the remotely controlled valve during the non-operational state of the operating devices (such as a control lever) is already preset as a threshold level, if the pressure sensed by the pressure sensor 35 is lower than the threshold level, the controller 4 judges the operating device to be in the non-operational state. When, in step S100, none of the operating devices is judged to being actuated, the controller 4 advances to step S110 to judge whether the non-operational state has continued for a predetermined time Ta (e.g., 5 minutes). When, in step S100, none of the operating devices is judged to being actuated (i.e., even one operating device is judged to being actuated), or when, in step S110, the non-operational state is judged not to have continued for the predetermined time Ta (e.g., 5 minutes), the controller 4 returns to the sequence immediately following the start of the process, and repeats steps S100, S110. When it is judged in step S110 that the non-operational state of all operating devices is judged to have continued for the predetermined time Ta, the controller 4 advances to step S120 to check the sensor signal of the differential pressure sensor 36 and judge whether the detected pressure value (differential pressure across the filter 32) is greater than a second predetermined pressure P2 that is a pressure at which forced regeneration is started.

Figure 5:
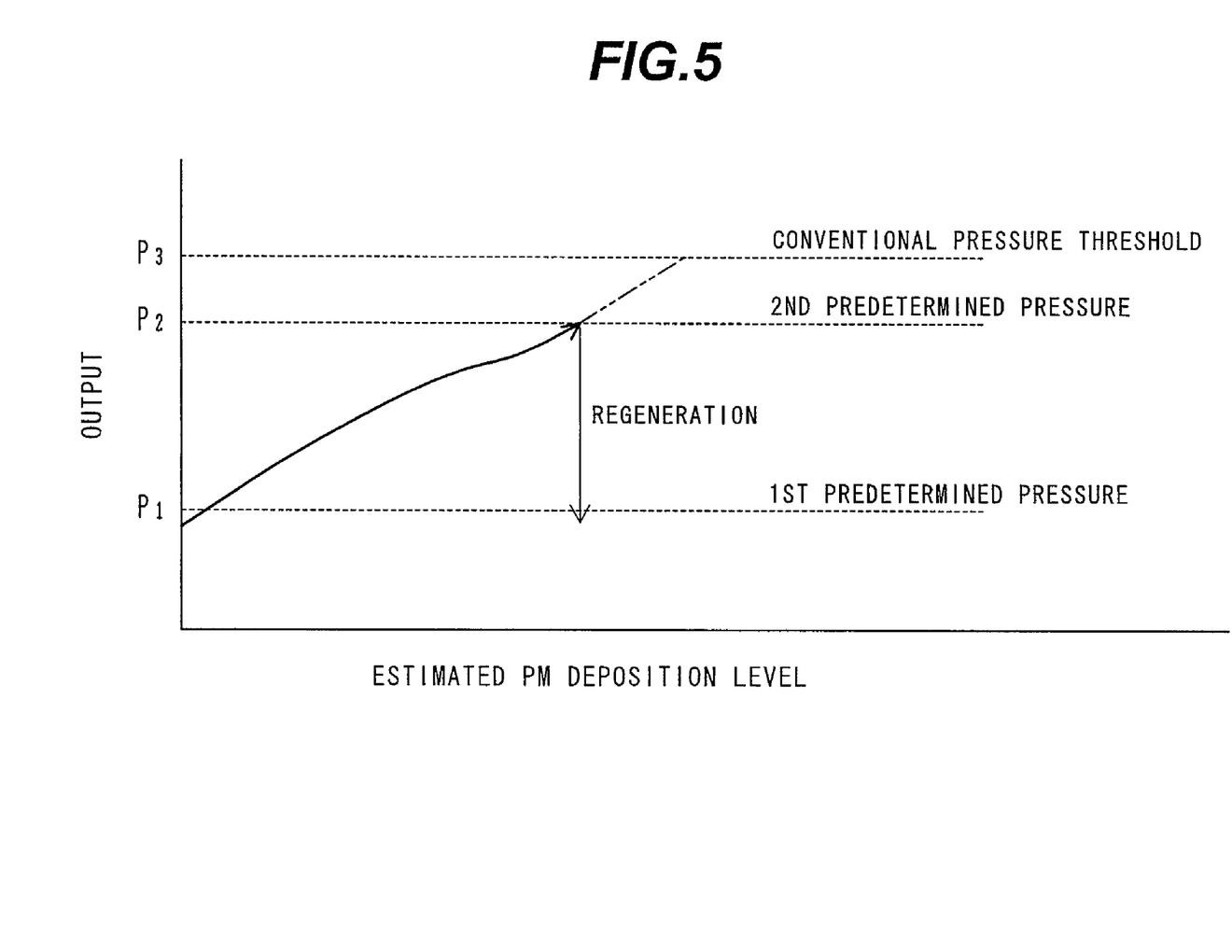
FIG. 5 is a diagram showing a relationship between an estimated PM deposition level in the filter and a differential pressure existing across the filter.

FIG. 5 is a diagram showing a relationship between a PM deposition level in the filter 32 and the differential pressure across the filter 32. Increases in the PM deposition level of the filter 32 increase the differential pressure across the filter 32. Reference symbol P3 in FIG. 5 denotes a pressure threshold of a filter differential pressure equivalent to a PM deposition level existing during a start of regeneration in the conventional filter automatic regenerating technology. In the conventional filter automatic regenerating technology, the amount of PM deposited is estimated from the differential pressure across the filter, and when this estimated PM deposition level reaches a predetermined value, forced regeneration is started. The second predetermined pressure P2 (forced regeneration starting pressure) used during the judgment in step S140 of FIG. 4 is set to be lower than the pressure threshold P3 of the filter differential pressure equivalent to the estimated PM deposition level, that is, P2<P3. Reference symbol P1 in FIG. 5 denotes a first predetermined pressure at which forced regeneration is ended. In this case, P1<P2.

In the present embodiment, the detected pressure value from the differential pressure sensor 36 may be used intact. Preferably, however, the detected pressure value from the differential pressure sensor 36 is temperature-corrected by using the exhaust gas temperature sensed at the upstream side of the filter 32 by the exhaust gas temperature sensor 37, and the temperature-corrected value is used.

If, in step S120 of FIG. 4, the pressure sensed by the differential pressure sensor 36 (i.e., the differential pressure across the filter 32) is judged not to be higher than the second predetermined pressure P2, since the amount of PM deposited in the filter 32 is judged to be too small for regeneration, the controller 4 judges it unnecessary to conduct the regeneration, returns to the sequence immediately following the start of the process, and repeats steps S100, S110, S120. When the pressure sensed by the differential pressure sensor 36 (i.e., the differential pressure across the filter 32) is judged to be higher than the second predetermined pressure P2, the controller 4 executes step S130 to control the speed of the engine 1 to a predetermined speed Na suitable for the regeneration, and then proceeds to step S140 to start the forced regeneration of the filter 32.

During the control of the engine speed in step S130, a desired speed of the engine 1 is switched from a target speed that the engine control dial 2 indicates, to the predetermined speed higher than a low idling speed and suitable for the forced regeneration, and then on the basis of the predetermined speed and the actual engine speed sensed by the speed sensor 3, a fuel injection quantity at the electronic governor 1a is feedback-controlled for the engine speed to match the predetermined speed. The predetermined speed suitable for forced regeneration is a speed at which the exhaust gas temperature at the particular time can be increased above an activation temperature of the oxidizing catalyst 33, and this speed is a middle speed of about 1,800 rpm, for example.

During the starting process for forced regeneration of the filter 32 in step S140, the fuel injector 39, for example, is first controlled to conduct preliminary injection that is fuel injection for increased exhaust gas temperature. Next, after confirmation that the exhaust gas temperature sensed by the exhaust gas temperature sensor 37 has increased to a predetermined temperature, fuel injection (main injection) for burning-off of PM is conducted. The fuel injection for increased exhaust gas temperature is conducted to forcibly regenerate the filter by injecting fuel into the exhaust pipe 31, thus burning the fuel by heat of the exhaust gases flowing through the exhaust pipe, and increasing the exhaust gas temperature above the activation temperature of the oxidizing catalyst 33. The fuel injection for the burning-off of the PM is conducted to burn off the PM deposited in the filter 32, by injecting fuel into the exhaust pipe 31, thus supplying an unburnt internal fuel in the exhaust pipe to the oxidizing catalyst 33, then oxidizing the unburnt fuel through the oxidizing catalyst 33, and feeding the resulting reaction heat into the filter 32.

After the start of forced regeneration in step S140, whether any one of the operating devices including the control levers 28, 29 for the remote controlled valves 25 to 27 has been operated is judged in step S150 using the sensor signal of the pressure sensor 35. When none of the operating devices is judged to have been operated (i.e., when none of the operating devices is judged to being actuated), whether the engine control dial 2 has been operated is judged in step S160 using the command signal of the engine control dial 2. When the engine control dial 2 is judged to be in the non-operational state, whether the pressure sensed by the differential pressure sensor 36 (the differential pressure across the filter 32) is lower than the first predetermined pressure P1 that is an ending pressure of forced regeneration is judged in step S170 using the sensor signal of the sensor 36. Steps S150, S160, and S170 are repeated when the detected pressure is judged not to be lower than the first predetermined pressure P1. When any one of the operating devices including the control levers 28, 29 for the remote controlled valves 25 to 27 has been operated is judged in step S150, or when the engine control dial 2 is judged to have been operated is judged in step S160, or when, in step S170, the detected pressure is judged to be lower than the first predetermined pressure P1, the regenerating fuel injector 39 is deactivated and forced regeneration is terminated in step S180. After this, the controller 4 returns the engine to normal control mode in step S190 by switching the desired speed of the engine 1 to the target speed indicated by the engine control dial 2.

Next, operation of the above-configured exhaust gas cleaning system according to the present invention is described below.

In a case where operator has a rest in the cabin during his or her work with the construction machine (hydraulic excavator), the operator may not operate any of the operating devices (including the control levers 28, 29 for the remote controlled valves 25-27) with the engine 1 kept running for a certain time. In that case, the controller 4 monitors the particular non-operational state. If the non-operational state continues for the predetermined time Ta (e.g., 5 minutes), when the pressure sensed by the differential pressure sensor 36 (the differential pressure across the filter 32) is higher than the second predetermined pressure P2, the controller 4 controls the engine speed to the predetermined speed Na suitable for regeneration, and then starts forced regeneration. That is to say, the process advances to steps S100, S110, S120, S130, and S140, in that order. This activates the regenerating fuel injector 39 to burn off the PM deposited in the filter 32, as described above. In addition, when the differential pressure across the filter 32, that is, the pressure sensed by the differential pressure sensor 36, is reduced below the first predetermined pressure P1 by the burning-off of the PM, the controller 4 terminates the regeneration automatically, switches the target speed of the engine 1 to the original target speed indicated by the engine control dial 2, and returns the engine to normal control mode. That is to say, the process advances to steps S170, S180, and S190, in that order.

Even when the non-operational state of all operating devices continues for the predetermined time Ta (e.g., 5 minutes), if the pressure sensed by the differential pressure sensor 36 (the differential pressure across the filter 32) is not higher than the second predetermined pressure P2, the controller 4 does not start forced regeneration and monitors the non-operational state of all operating devices (the process advances to steps S100, S110, S120, and then returns to S100). Unnecessary regeneration is thus avoided.

When any one of the operating devices including the control levers 28, 29 for the remote controlled valves 25 to 27 is operated by the operator to restart his or her work during forced regeneration, the controller 4 senses the particular operation, then immediately terminates forced regeneration, and returns the engine to normal control mode by switching the target speed of the engine 1 to the original target speed indicated by the engine control dial 2. That is to say, the process advances to steps S150, S180, and S190, in that order. This allows the operator to restart the work at once.

Additionally, the operator 4 may re-set the target speed by operating the engine control dial 2 before operating some operating device to restart the work. In such a case, the controller 4 also senses that the engine control dial 2 has been operated, then immediately terminates forced regeneration, and returns the engine to normal control mode by switching the target speed of the engine 1 to the original target speed indicated by the engine control dial 2. That is to say, the process advances to steps S160, S180, and S190, in that order. This also allows the operator to restart the work at once.

The present embodiment constructed as described above offers the following advantageous effects:

(a) When the operator returns all operating devices to the respective neutral positions and this state (the non-operational state) continues for the predetermined time Ta, the regenerating device enters forced regeneration automatically and burns off the PM deposited in the filter 32. Thus, forced regeneration can be repeated more often than in the case that forced regeneration is started when the amount of PM deposited in the filter 32 exceeds the amount of deposition existing immediately before the regeneration is started. As a result, the filter can be regenerated before a large amount of PM becomes deposited therein. Therefore, a decrease in output due to the exhaust gas pressure rise existing immediately before the regeneration is started can be avoided and the likelihood of an unusual increase in an internal temperature of the filter 32 due to the combustion of the PM, associated with execution of the regeneration, and consequential thermal damage to the filter 32 can be reduced.

(b) To restart the work during forced regeneration, the operator can immediately terminate forced regeneration just by operating any one of the operating devices. This allows the work to be restarted at once.

(c) When the operation of the engine control dial 2 is intended to restart the work during forced regeneration, the operator can also restart the work at once since forced regeneration terminates immediately.

(d) When the differential pressure across the filter 32 decreases below the first predetermined pressure P1, the regeneration is terminated automatically and the engine 1 is returned to its original control mode. This is extremely convenient in that the operator can take a rest without having to be aware of the fact that the regeneration is in progress. A decrease in life of the filter 32 due to overburning can also be avoided.

(e) When the differential pressure across the filter 32 is not higher than the first predetermined pressure P2, the system does not enter forced regeneration, so unnecessary regeneration can be prevented and a decrease in the life of the filter 32 due to overburning can be avoided.

(f) When the forced regeneration is started after the operating devices kept in the non-operational state for the predetermined time, the engine speed is controlled to the predetermined speed Na suitable for the regeneration. The exhaust gas temperature can therefore be increased to a temperature level fit for the regeneration of the filter (i.e., the burning-off of the deposited PM), and thus, optimal regeneration is enabled. In addition, when the engine speed existing before forced regeneration is started is higher than the predetermined speed Na for the regeneration, the engine speed is lowered to the predetermined level Na immediately before forced regeneration is started, so unnecessary fuel consumption is suppressed and the fuel can be saved.

Figure 6:
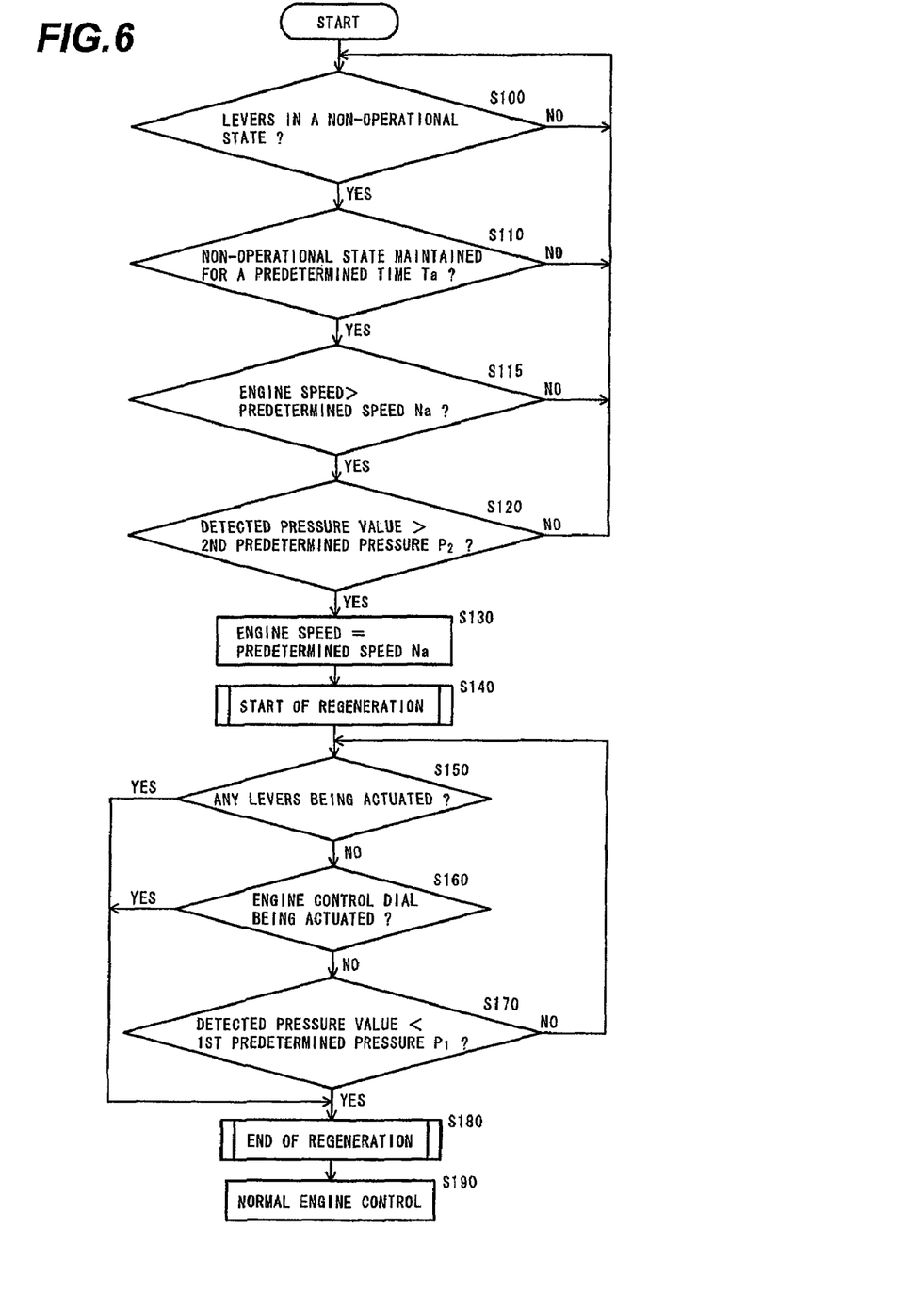
FIG. 6 is a flowchart that shows arithmetic details of a filter-regenerating arithmetic process by a controller in an exhaust gas cleaning system for a construction machine according to another embodiment of the present invention.

Another embodiment of the present invention is described below by using FIG. 6. FIG. 6 is a flowchart that shows arithmetic details of the filter-regenerating arithmetic process by the controller in the exhaust gas cleaning system of the second embodiment. The same steps as those shown in FIG. 4 are each assigned the same reference number in FIG. 6. In the present embodiment, whether the target speed that the engine control dial 2 indicates is higher than the predetermined speed Na suitable for the regeneration is added as a forced-regeneration starting parameter in the arithmetic process by the controller.

This parameter is described in detail below using FIG. 6. First, in step S100, the controller 4 (see FIG. 1) checks the sensor signal of the pressure sensor 35 and judges whether all operating devices including the control levers 28, 29 for the remote controlled valves 25 to 27 are in the non-operational state (i.e., whether none of the operating devices is being actuated). When all operating devices are in the non-operational state, the controller 4 judges in step S110 whether the non-operational state has continued for the predetermined time Ta (e.g., 5 minutes). The process up to this step is the same as in the first embodiment. Next in the present embodiment, the controller 4 judges in step S115 whether the target speed that the engine control dial 2 indicates is higher than the predetermined speed Na that is the engine speed for the regeneration. When the target speed is higher than the predetermined speed Na for the regeneration, the controller proceeds to step S120 to check the sensor signal of the differential pressure sensor 36 and judge whether the pressure sensed by the sensor 36 (the differential pressure across the filter 32) is higher than the second predetermined pressure P2 that is the starting pressure of forced regeneration. When the target speed is not higher than the predetermined speed Na for the regeneration, the controller returns to the sequence immediately following the start of the process, and repeats steps S100, S110, and S115, in that order. Other steps are the same as those of the first embodiment shown in FIG. 4.

The judgment on whether the target speed that the engine control dial 2 indicates is higher than the predetermined speed Na for the regeneration may be conducted after the judgment on whether the pressure sensed by the sensor 36 (the differential pressure across the filter 32) is higher than the second predetermined pressure P2 that is the starting pressure of forced regeneration. Alternatively, the command-based speed finally sent to the electronic governor 1*a* or the actual speed sensed by the speed sensor 3 may be used instead of the target speed that the engine control dial 2 indicates.

In the present embodiment constructed as described above, even when the non-operational state of all operating devices is sensed by using the sensor signal of the pressure sensor 35 and the non-operational state continues for the predetermined time, if the target speed that the engine control dial 2 indicates is not higher than the predetermined speed Na for the regeneration, the system does not enter forced regeneration. Therefore, a non-intended increase in engine speed is avoided and the regeneration can be conducted without giving a sense of discomfort to the operator.

Construction machines such as hydraulic excavators usually have an automatic idling control function. Automatic idling control reduces the revolutions of the engine 1 to a low speed automatically when the non-operational state of all operating devices continues for a predetermined time (e.g., nearly 10 seconds). When the exhaust gas cleaning system of the present embodiment is applied to a machine model having such an automatic idling control system, since the predetermined time (e.g., 5 minutes) of the non-operational state monitored by the control function of the present embodiment is longer, the engine speed decreases to the low speed before forced regeneration is started by the exhaust gas cleaning system. In this case, despite the intent of the present embodiment, the start of forced regeneration causes a non-intended increase in engine speed. For this reason, when the exhaust gas cleaning system of the present embodiment is applied to a machine model having the automatic idling control system, the system allows the operator to select making automatic idling ineffective.

While an embodiment of the present invention has been described above, the invention is not limited to or by the embodiment and can be modified in various forms within the spirit of the invention. Some of these modifications are itemized below.

1. While the fuel injection for regeneration in the above embodiment is conducted by the regenerating fuel injector 39 provided at the exhaust pipe 31, an engine in-cylinder injection system using the electronic governor 1*a* may be used to inject the regenerating fuel into the exhaust gases by executing post-injection (as sub-injection) in an expansion stroke of the engine after multistage main injection. Such a technique is described in, for example, Patent Document 1 (JP-A-2005-282545) and other documents such as JP-A-2006-37925 and JP-A-2002-276340.

2. In addition, for the injection of the regenerating fuel into the exhaust gases, although a restrictor provided in the exhaust pipe may be used to dimensionally restrict a flow passageway thereof or the hydraulic pump driven by the engine may be loaded for loaded operation of the engine, whereby the exhaust gas temperature can be rapidly increased to a temperature fit for the regeneration.

3. Although the above embodiment is constructed to terminate the regeneration when the differential pressure across the filter 32 decreases below the first predetermined pressure P1 following the start of the regeneration, an elapsed time from the start of the regeneration may be managed for the regeneration to be terminated when a predetermined time (e.g., 20 minutes) elapses from the start of the regeneration.

4. In the above embodiment, when the pressure sensed by the differential pressure sensor 36 (the differential pressure across the filter 32) increases above the second predetermined pressure P2, the system enters forced regeneration. However, this sequence may be omitted. In this case, when the non-operational state continues for the predetermined time Ta, forced regeneration is started immediately and if the differential pressure across the filter 32 during the start of the regeneration is higher than the first predetermined pressure P1, the regeneration is conducted until the particular differential pressure has decreased below the first predetermined pressure P1. Conversely if the differential pressure across the filter 32 during the start of the regeneration is lower than the first predetermined pressure P1, the regeneration is terminated immediately.

5. In the above embodiment, the system is adapted to abort forced regeneration not only when any one of the operating devices is operated during forced regeneration, but also when the engine control dial 2 is operated. However, the system may be adapted to abort forced regeneration only when any one of the operating devices is operated.

6. In the above embodiment, when forced regeneration is started, the rotating speed of the engine 1 is controlled to the predetermined speed Na suitable for the regeneration. If the particular engine speed is higher than the predetermined speed Na, however, the forced regeneration may be started at the engine speed, whereby a change in the engine speed is avoided with each start of the forced regeneration.

The invention claimed is:

1. An exhaust gas cleaning system for a construction machine comprising: a diesel engine; a plurality of driven bodies actuated by motive power of the engine; operating means for issuing an operating command to each of the driven bodies; and an automatic idling control system which reduces revolutions of the engine to a low speed when a non-operational state of the operating means continues for a first predetermined time,
wherein the exhaust gas cleaning system comprising:
a filter disposed in an exhaust system of the engine in order to trap any particulate matter included in exhaust gases;
a regenerating device which regenerates said filter by burning off the particulate matter deposited therein;
operational sensing means for sensing whether the operating means are in a non-operational state; and
a regeneration control device which activates said regenerating device when said automatic idling control system is ineffective and the non-operational state of the operating means is sensed by said operational sensing means and the non-operational state continues for a second predetermined time that is longer than said first predetermined time.

2. The exhaust gas cleaning system according to claim 1, wherein said regeneration control device deactivates said regenerating device when an operating state of the operating means is sensed by said operational sensing means during an operating state of said regenerating device.

3. The exhaust gas cleaning system according to claim 1, further comprising:
target speed command means for issuing a command which specifies a target speed for the engine,
wherein said regeneration control device deactivates said regenerating device when the target speed specified by the command issued from the target speed command means changes during an operating state of said regenerating device.

4. The exhaust gas cleaning system according to claim 1, further comprising:
a pressure sensor which senses a pressure loss in said filter, wherein said regeneration control device deactivates said regenerating device when the pressure loss sensed by the pressure sensor decreases below a first predetermined pressure level.

5. The exhaust gas cleaning system according to claim 1, further comprising:
a pressure sensor which senses a pressure loss in said filter, wherein said regeneration control device activates said regenerating device when the non-operational state of the operating means is sensed by said operational sensing means and continues for said second predetermined time, and the pressure loss sensed by the pressure sensor is higher than a second predetermined pressure level.

6. The exhaust gas cleaning system according to claim 1, wherein said regeneration control device controls a rotating speed of the engine to a predetermined speed in activation timing of said regenerating device, after the non-operational state of the operating means is sensed by said operational sensing means and continues for said second predetermined time, when said regeneration control device activates said regenerating device.

7. The exhaust gas cleaning system according to claim 1, further comprising:
target speed command means for issuing a command which specifies a target speed for the engine, wherein said regeneration control device activates said regenerating device when the non-operational state of the operating means is sensed by said operational sensing means and continues for said second predetermined time, and the target speed specified by the command issued from the target speed command means is higher than a predetermined speed.

8. The exhaust gas cleaning system according to claim 1, wherein said regenerating device includes an oxidizing catalyst disposed at an upstream side of said filter, and fuel supply means for supplying a fuel to the oxidizing catalyst, said regenerating device activates the oxidizing catalyst by forcibly raising a temperature of the engine exhaust gases to a level higher than the activation temperature of the oxidizing catalyst, the fuel supply means supplies the fuel to the oxidizing catalyst, and said regenerating device raises the exhaust gas temperature by means of heat generated by a reaction between the fuel and the catalyst, and burns off the particulate matter deposited in the filter.

* * * * *